(12) United States Patent
Komatsu et al.

(10) Patent No.: US 11,528,622 B2
(45) Date of Patent: Dec. 13, 2022

(54) VEHICLE

(71) Applicant: SUBARU CORPORATION, Tokyo (JP)

(72) Inventors: Yusuke Komatsu, Tokyo (JP); Masaru Oe, Tokyo (JP); Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/484,639

(22) Filed: Sep. 24, 2021

(65) Prior Publication Data

US 2022/0104039 A1 Mar. 31, 2022

(30) Foreign Application Priority Data

Sep. 29, 2020 (JP) .............................. JP2020-163572

(51) Int. Cl.
| | | |
|---|---|---|
| *H04B 7/00* | (2006.01) | |
| *H04W 24/04* | (2009.01) | |
| *H04W 4/80* | (2018.01) | |
| *H04W 4/40* | (2018.01) | |
| *H04W 24/08* | (2009.01) | |

(52) U.S. Cl.
CPC .............. *H04W 24/04* (2013.01); *H04W 4/40* (2018.02); *H04W 4/80* (2018.02); *H04W 24/08* (2013.01)

(58) Field of Classification Search
CPC ......... H04W 24/04; H04W 4/80; H04W 4/40; H04W 24/08
USPC ...................................................... 455/67.11
See application file for complete search history.

(56) References Cited

U.S. PATENT DOCUMENTS

| | | | | |
|---|---|---|---|---|
| 8,249,547 | B1* | 8/2012 | Fellner ................. | G08B 25/016 |
| | | | | 455/556.1 |
| 9,620,104 | B2* | 4/2017 | Naik ....................... | G10L 13/08 |
| 9,633,674 | B2* | 4/2017 | Sinha ...................... | G10L 25/00 |
| 10,043,323 | B1* | 8/2018 | Konrardy ............ | G06Q 20/0855 |
| 10,176,167 | B2* | 1/2019 | Evermann ............... | G06F 40/35 |

(Continued)

FOREIGN PATENT DOCUMENTS

JP 2016-502697 A 1/2016

*Primary Examiner* — April G Gonzales
(74) *Attorney, Agent, or Firm* — McDermott Will & Emery LLP

(57) ABSTRACT

A vehicle includes a vehicle-mounted communication unit capable of wirelessly communicating telematics information to and from an external server, a monitoring unit that monitors whether an abnormality has occurred in the vehicle-mounted communication unit because of a security incident, and a control unit that controls a vehicle-mounted device. When detecting occurrence of an abnormality in the vehicle-mounted communication unit, the monitoring unit disconnects communication between the vehicle-mounted communication unit and the monitoring unit and notifies the control unit of the abnormality. The control unit can wirelessly communicate with a mobile communication terminal in accordance with a certain profile of a short-range wireless communication standard for a function of the vehicle-mounted device. The control unit instructs, when being notified of the abnormality, the mobile communication terminal to perform an operation in accordance with the certain profile so as to report the abnormality to the external server via the mobile communication terminal.

9 Claims, 6 Drawing Sheets

(56) References Cited

U.S. PATENT DOCUMENTS

| | | | |
|---|---|---|---|
| 10,446,141 B2* | 10/2019 | Krishnamoorthy | G10L 15/02 |
| 2011/0059720 A1* | 3/2011 | Penix | H04W 4/90 |
| | | | 455/41.3 |
| 2013/0117078 A1* | 5/2013 | Weik, III | G06Q 10/00 |
| | | | 705/13 |
| 2014/0143839 A1* | 5/2014 | Ricci | H04N 21/814 |
| | | | 726/4 |
| 2014/0306833 A1* | 10/2014 | Ricci | G06F 16/583 |
| | | | 340/901 |
| 2014/0309789 A1* | 10/2014 | Ricci | G06F 16/25 |
| | | | 700/276 |
| 2014/0310075 A1* | 10/2014 | Ricci | B60W 50/085 |
| | | | 705/13 |
| 2015/0019266 A1* | 1/2015 | Stempora | G06Q 40/08 |
| | | | 705/4 |
| 2015/0025917 A1* | 1/2015 | Stempora | G06Q 40/08 |
| | | | 705/4 |
| 2015/0223271 A1* | 8/2015 | Penix | H04W 4/80 |
| | | | 455/404.2 |
| 2015/0271201 A1* | 9/2015 | Ruvio | B60R 16/0231 |
| | | | 726/23 |
| 2017/0085437 A1* | 3/2017 | Condeixa | H04L 43/06 |
| 2017/0149820 A1* | 5/2017 | Ruvio | H04L 63/1466 |
| 2019/0179320 A1* | 6/2019 | Pacala | G05D 1/0214 |

* cited by examiner

VEHICLE

CROSS-REFERENCE TO RELATED APPLICATIONS

The present application claims priority from Japanese Patent Application No. 2020-163572 filed on Sep. 29, 2020, the entire contents of which are hereby incorporated by reference.

BACKGROUND

The disclosure relates to a vehicle.

A telematics service is one of recent services for providing information to vehicles. In the telematics service, each vehicle and an external server bidirectionally communicate with each other to provide various kinds of information to an occupant of the vehicle. In relation to the telematics service, a vehicle-mounted communication unit called a telematics unit is installed in each vehicle. For example, each vehicle-mounted communication unit transmits information regarding a driving state of the vehicle to the external server and receives information regarding driving support to be used by the vehicle from the external server.

When the vehicle-mounted communication unit is hacked and a security incident occurs, the vehicle-mounted communication unit is to be isolated from a vehicle system before the security incident influences a behavior of the vehicle. For example, Japanese Unexamined Patent Application Publication (Translation of PCT Application) No. 2016-502697 discloses a technique for a vehicle including a communication device and an attack detection unit. According to the technique, when the attack detection unit detects the occurrence of a security incident in the communication device, a communication channel between the communication device and the attack detection unit is disconnected.

SUMMARY

An aspect of the disclosure provides a vehicle including a vehicle-mounted communication unit, a monitoring unit, and a control unit. The vehicle-mounted communication unit is installed in the vehicle and is capable of wirelessly communicating information for a telematics service to and from an external server. The monitoring unit is configured to monitor whether an abnormality has occurred in the vehicle-mounted communication unit because of a security incident. The control unit is configured to control a vehicle-mounted device installed in the vehicle. In response to detecting occurrence of an abnormality in the vehicle-mounted communication unit, the monitoring unit disconnects communication between the vehicle-mounted communication unit and the monitoring unit and notifies the control unit of the abnormality in the vehicle-mounted communication unit. The control unit is capable of wirelessly communicating with a mobile communication terminal in accordance with a certain profile corresponding to a function of the vehicle-mounted device among a plurality of profiles of a short-range wireless communication standard. The control unit is configured to instruct, when being notified of the abnormality in the vehicle-mounted communication unit from the monitoring unit, the mobile communication terminal to perform an operation for reporting the abnormality in the vehicle-mounted communication unit in accordance with the certain profile of the short-range wireless communication standard, so as to report the abnormality in the vehicle-mounted communication unit to the external server via the mobile communication terminal while the communication via the vehicle-mounted communication unit is disconnected.

An aspect of the disclosure provides a vehicle including circuitry installed in the vehicle. The circuitry has a communication capability of wirelessly communicating information for a telematics service to and from an external server. The circuitry is configured to monitor whether an abnormality has occurred in the communication capability because of a security incident. The circuitry is configured to control a vehicle-mounted device installed in the vehicle. In response to detecting occurrence of an abnormality in the communication capability, the circuitry disables the communication capability. The circuitry is capable of wirelessly communicating with a mobile communication terminal in accordance with a certain profile corresponding to a function of the vehicle-mounted device among a plurality of profiles of a short-range wireless communication standard. The circuitry is configured to instruct, in response to detecting the abnormality in the communication capability, the mobile communication terminal to perform an operation for reporting the abnormality in the communication capability in accordance with the certain profile of the short-range wireless communication standard, so as to report the abnormality in the communication capability to the external server via the mobile communication terminal while the communication capability is disabled.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

When an abnormality occurs in a vehicle-mounted communication unit because of a security incident such as hacking, information regarding the abnormality is to be quickly uploaded to an external server of an organization, such as a security incident response team (SIRT), that deals with such an incident. However, in the case where the vehicle-mounted communication unit is simply isolated from a vehicle system as in the related art described above, a capability of the vehicle-mounted communication unit to transmit the information regarding the abnormality to the external server is lost. Thus, it is difficult to upload such information to the external server.

Accordingly, it is desirable to provide a vehicle capable, in response to occurrence of an abnormality in a vehicle-mounted communication unit because of a security incident such as hacking, of reducing a likelihood of the security incident adversely influencing a behavior of the vehicle and of transmitting information regarding the abnormality in the vehicle-mounted communication unit to an external server.

An embodiment of the disclosure will be described in detail below with reference to the accompanying drawings. The dimensions, materials, specific numerical values, etc. described in the embodiment are merely presented as examples to facilitate understanding of the disclosure, and do not limit the disclosure unless otherwise noted. In the specification and drawings, components having substantially the same functions and configurations are denoted by the same reference signs, and redundant description thereof is thus omitted. Components that are not directly related to the disclosure are not illustrated.

Figure 1:
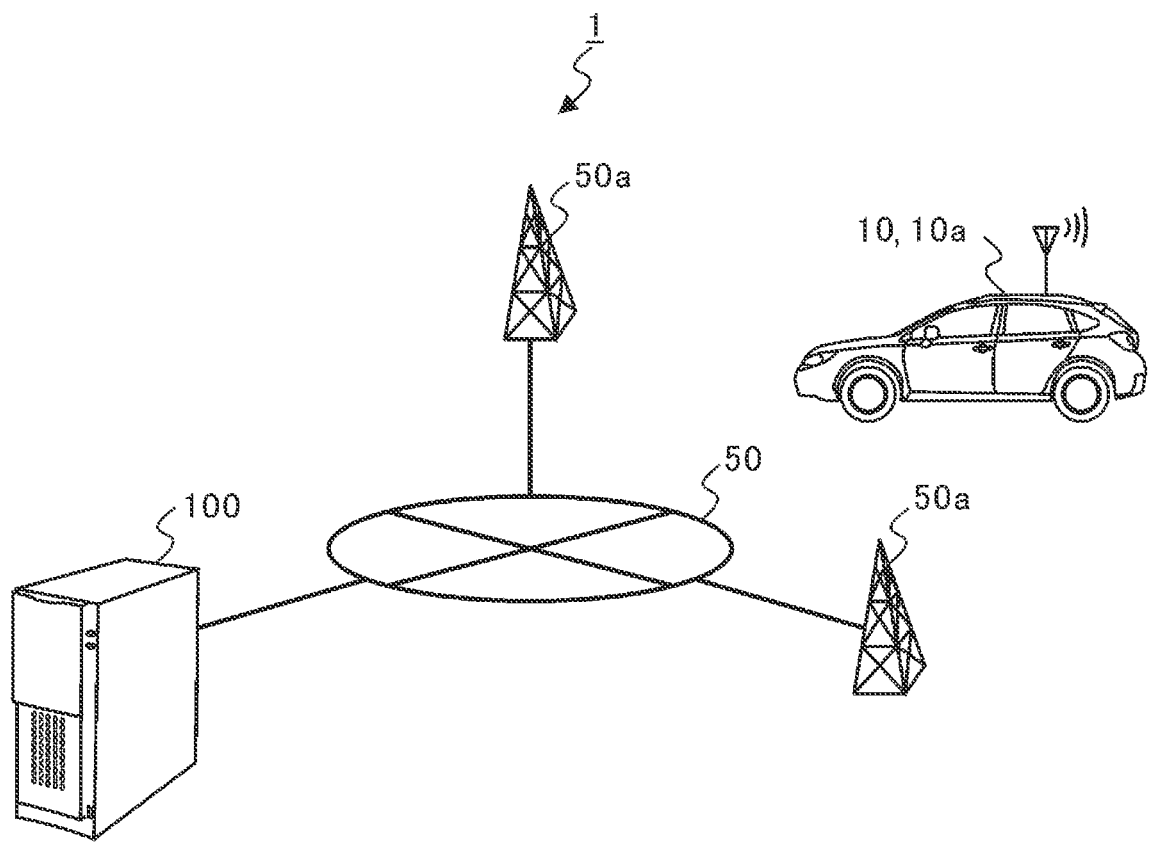
FIG. 1 is a diagram illustrating a schematic configuration of a vehicle information system.

FIG. 1 is a diagram illustrating a schematic configuration of a vehicle information system 1. As illustrated in FIG. 1, the vehicle information system 1 includes a vehicle 10, a communication network 50, and an external server 100. The vehicle 10 includes a vehicle-mounted communication unit 10a. The communication network 50 includes communication base stations 50a.

The vehicle 10 is, for example, an automobile including a least one driving source such as an engine or a motor. FIG. 1 illustrates an example in which the vehicle information system 1 includes a single vehicle 10. However, the number of vehicles 10 is not limited to this. For example, the vehicle information system 1 may include a plurality of vehicles 10.

The vehicle-mounted communication unit 10a is installed in the vehicle 10. The vehicle-mounted communication unit 10a is capable of wirelessly communicating with the external server 100 via the communication base station 50a and the communication network 50. In one example, the vehicle-mounted communication unit 10a is a data communication module (DCM).

The communication network 50 may be, for example, Internet, a mobile phone network, or personal handy-phone system (PHS) network. The communication network 50 connects communication between the vehicle-mounted communication unit 10a and the external server 100 via the communication base station 50a. In the embodiment, the case will be described where the Internet is used as the communication network 50. The vehicle-mounted communication unit 10a communicates with the external server 100 to transmit information regarding a driving state of the vehicle to the external server 100 and to receive information regarding driving support to be used by the vehicle 10 from the external server 100. Thus, the vehicle-mounted communication unit 10a transmits and receives information for a telematics service to and from the external server 100.

The communication base station 50a is connected to the communication network 50. The communication base station 50a wirelessly transmits and receives information to and from the vehicle-mounted communication unit 10a. The communication base station 50a transmits, to the external server 100 via the communication network 50, information wirelessly transmitted from the vehicle-mounted communication unit 10a. The communication base station 50a transmits information generated by the external server 100 to the vehicle-mounted communication unit 10a.

The external server 100 accumulates the information transmitted from the vehicle-mounted communication unit 10a. In response to a request transmitted from the vehicle-mounted communication unit 10a, the external server 100 transmits information for the telematics service to the vehicle-mounted communication unit 10a. The external server 100 may be managed, for example, by an organization such as SIRT. The SIRT is an organization that deals with a security incident when the security incident occurs in the vehicle 10.

Figure 2:
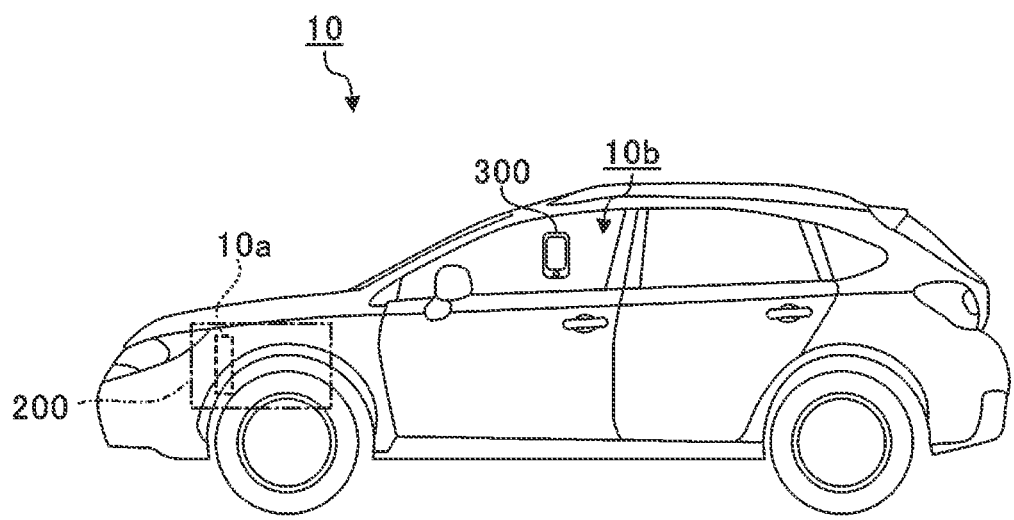
FIG. 2 is a diagram illustrating a schematic configuration of a vehicle.

FIG. 2 is a diagram illustrating a schematic configuration of the vehicle 10. As illustrated in FIG. 2, a vehicle system 200 including the vehicle-mounted communication unit 10a is installed in the vehicle 10. A mobile communication terminal 300 is disposed in an occupant room 10b of the vehicle 10. The mobile communication terminal 300 is, for example, a portable communication terminal carried by an occupant who is in the occupant room 10b. Examples of the mobile communication terminal 300 include a smartphone, a mobile phone, and a dedicated terminal. In the embodiment, the case will be described where a smartphone is used as the mobile communication terminal 300.

Figure 3:
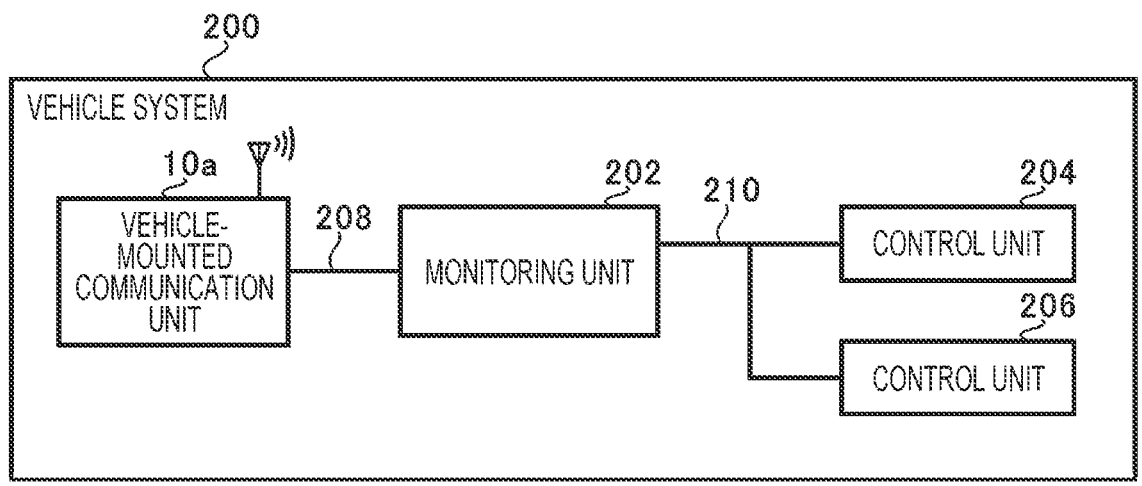
FIG. 3 is a schematic block diagram illustrating a configuration of a vehicle system.

FIG. 3 is a schematic block diagram illustrating a configuration of the vehicle system 200. As illustrated in FIG. 3, the vehicle system 200 includes the vehicle-mounted communication unit 10a, a monitoring unit 202, and a plurality of control units 204 and 206.

The monitoring unit 202 is electrically coupled to the vehicle-mounted communication unit 10a through a network bus 208. The monitoring unit 202 is also electrically coupled to the plurality of control units 204 and 206 through a network bus 210. The vehicle-mounted communication unit 10a is electrically coupled to the plurality of control units 204 and 206 through the network bus 208, the monitoring unit 202, and the network bus 210. The monitoring unit 202 is coupled to all the network busses 208 and 210 in the vehicle system 200 and monitors an in-vehicle network. In one example, the monitoring unit 202 is a central gateway (CGW). Based on information output from the vehicle-mounted communication unit 10a, the monitoring unit 202 monitors whether an abnormality has occurred in the vehicle-mounted communication unit 10a because of a security incident. Details of the monitoring unit 202 will be described later.

The plurality of control units 204 and 206 are constituted by a microcomputer including a central processing unit (CPU), a read-only memory (ROM) storing a program or the like, a random access memory (RAM) serving as a work area, etc. The plurality of control units 204 and 206 control various vehicle-mounted devices installed in the vehicle 10. Examples of the plurality of control units 204 and 206 include a steering electronic control unit (ECU), an anti-lock braking system (ABS) ECU, a fuel injection ECU, an air bag ECU, an air conditioner ECU, an in-vehicle light-adjusting ECU, a meter panel ECU, a sunroof ECU, a door lock ECU, and an automotive navigation system ECU. In the embodiment, the case will be described where an air bag ECU is used as the control unit 204. The control unit 204 controls air bag devices installed at a driver's seat and a passenger's seat of the vehicle 10. The case will be described where an automotive navigation system ECU is used as the control unit 206. The control unit 206 controls an automotive navigation system installed at a dashboard of the vehicle 10. The control unit 206 is capable of wirelessly communicating with the mobile communication terminal 300 in accordance with a certain profile corresponding to a function of the automotive navigation system among a plurality of profiles of a short-range wireless communication standard.

In the embodiment, the monitoring unit 202 monitors whether an abnormality has occurred in various vehicle-mounted devices because of an incident such as an accident in the vehicle 10. For example, in response to the occurrence of an incident such as an accident in the vehicle 10, the control unit 204, which is an air bag ECU, causes the air bag devices of the vehicle 10 to operate. At this time, the monitoring unit 202 acquires operation information of the air bag devices from the control unit 204. In response to acquiring the operation information of the air bag devices, the monitoring unit 202 determines that an incident has occurred in the vehicle 10. The monitoring unit 202 generates incident information indicating that the incident has occurred in the vehicle 10. The generated incident information is transmitted to the vehicle-mounted communication unit 10a via the network bus 208 and is uploaded to the external server 100 via the vehicle-mounted communication unit 10a.

Referring back to FIG. 2, the mobile communication terminal 300 is capable of wirelessly communicating with the communication base station 50a and with the communication network 50 (see FIG. 1). The mobile communication terminal 300 thus is capable of wirelessly communicating with the external server 100 via the communication base station 50a and the communication network 50. The mobile communication terminal 300 is capable of performing short-range wireless communication with the control unit 206 (see FIG. 3), which is an automotive navigation system ECU. The mobile communication terminal 300 is capable of performing short-range wireless communication with the control unit 206 in accordance with a certain profile of the short-range wireless communication standard implemented in the automotive navigation system. The short-range wireless communication standard is, for example, Bluetooth (registered trademark).

To establish a short-range wireless communication connection between the mobile communication terminal 300 and the control unit 206, a dedicated app (hereinafter, simply referred to as app) is to be started in the mobile communication terminal 300 in some cases. For example, there are three conceivable methods for starting the app of the mobile communication terminal 300. In one method, when the mobile communication terminal 300 and the control unit 206 are connected by short-range wireless communication, the connection is established via the app in the mobile communication terminal 300. In another method, an occupant is prompted, via a screen of the automotive navigation system, for example, to start the app in the mobile communication terminal 300 at the time of the occurrence of an abnormality in the vehicle system 200. In a still another method, a two-dimensional code such as a QR code (registered trademark) is displayed for example on the screen of the automotive navigation system, and the app is started when the two-dimensional code is read by the mobile communication terminal 300.

When a security incident occurs in the vehicle-mounted communication unit 10a, the vehicle-mounted communication unit 10a is to be isolated from the vehicle system 200 before the security incident influences a behavior of the vehicle 10. On the other hand, when a security incident occurs, information regarding the security incident (hereinafter, simply referred to as incident information) is to be uploaded to the external server 100 managed by the SIRT. However, if the vehicle-mounted communication unit 10a is isolated from the vehicle system 200, a capability of uploading the incident information to the external server 100 is lost. Thus, it is difficult to upload the incident information to the external server 100.

In the embodiment, the monitoring unit 202 monitors whether an abnormality has occurred in the vehicle-mounted communication unit 10a because of a security incident. In one example, the monitoring unit 202 stores, in a ROM (not illustrated), pieces of ID information used in communication performed between the vehicle-mounted communication unit 10a and the plurality of control units 204 and 206. The monitoring unit 202 also stores, in the ROM (not illustrated), pieces of information regarding respective intervals at which communication is performed between the vehicle-mounted communication unit 10a and the plurality of control units 204 and 206.

The monitoring unit 202 compares ID information acquired from the vehicle-mounted communication unit 10a via the network bus 208 with the pieces of ID information stored in the ROM. If the acquired ID information matches any of the pieces of ID information, the monitoring unit 202 determines that no abnormality has occurred in the vehicle-mounted communication unit 10a because of a security incident. The monitoring unit 20 compares an information communication interval acquired from the vehicle-mounted communication unit 10a via the network bus 208 with the pieces of information regarding the respective communication intervals stored in the ROM. If the acquired communication interval matches any of the communication intervals indicated by the respective stored pieces of information, the monitoring unit 202 determines that no abnormality has occurred in the vehicle-mounted communication unit 10a because of a security incident.

The monitoring unit 202 compares the ID information acquired from the vehicle-mounted communication unit 10a via the network bus 208 with the pieces of ID information stored in the ROM. If the acquired ID information differs from all the stored pieces of ID information, the monitoring unit 202 determines that an abnormality has occurred in the vehicle-mounted communication unit 10 because of a security incident. The monitoring unit 20 compares the information communication interval acquired from the vehicle-mounted communication unit 10a via the network bus 208 with the pieces of information regarding the respective communication intervals stored in the ROM. If the acquired communication interval differs from all the communication intervals indicated by the respective stored pieces of information, the monitoring unit 202 determines that an abnormality has occurred in the vehicle-mounted communication unit 10a because of a security incident.

In response to determining that an abnormality has occurred in the vehicle-mounted communication unit 10a because of a security incident, the monitoring unit 202 disconnects communication with the vehicle-mounted communication unit 10a. For example, the monitoring unit 202 discards all the information received from the vehicle-mounted communication unit 10a to disconnect communication with the vehicle-mounted communication unit 10a. Alternatively, the monitoring unit 202 may block the network bus 208 to disconnect communication with the vehicle-mounted communication unit 10a.

The monitoring unit 202 generates incident information indicating that a security incident has occurred in the vehicle-mounted communication unit 10a. The incident information is, for example, flag information indicating that the vehicle-mounted communication unit 10a is abnormal.

However, the incident information is not limited to this and may include information regarding details of the security incident.

The monitoring unit 202 transmits the generated incident information to the control unit 206 via the network bus 210. The control unit 206 transmits the incident information received from the monitoring unit 202, to the mobile communication terminal 300 in accordance with a certain profile of the short-range wireless communication standard.

Figure 4:
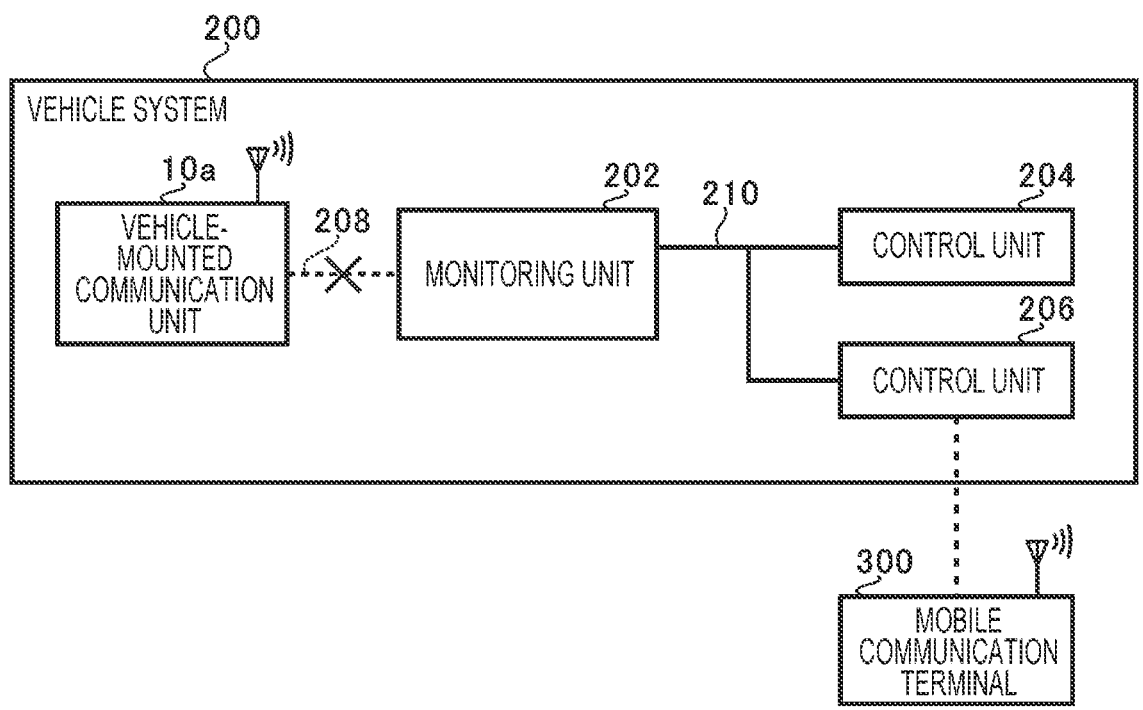
FIG. 4 is a schematic block diagram for describing an operation performed by the vehicle system in response to the occurrence of a security incident in a vehicle-mounted communication unit.

FIG. 4 is a schematic block diagram for describing an operation performed by the vehicle system 200 in response to the occurrence of a security incident in the vehicle-mounted communication unit 10a. As illustrated in FIG. 4, in response to the occurrence of a security incident in the vehicle-mounted communication unit 10a, communication between the vehicle-mounted communication unit 10a and the monitoring unit 202 is disconnected. While the communication is disconnected, the control unit 206 acquires the incident information from the monitoring unit 202.

The control unit 206 performs short-range wireless communication with the mobile communication terminal 300 in accordance with a certain profile corresponding to a function of the automotive navigation system among a plurality of profiles of a short-range wireless communication standard. When being notified of an abnormality in the vehicle-mounted communication unit 10a from the monitoring unit 202, the control unit 206 instructs the mobile communication terminal 300 to perform an operation for reporting the abnormality in the vehicle-mounted communication unit 10a. Consequently, the abnormality in the vehicle-mounted communication unit 10a is reported to the external server 100 via the mobile communication terminal 300 while the communication via the vehicle-mounted communication unit 10a is disconnected.

Some profiles, among a plurality of profiles of the short-range wireless communication standard, can be used to exchange information by short-range wireless communication between the automotive navigation system installed in the vehicle 10 and the mobile communication terminal 300. Accordingly, to implement short-range wireless communication with the mobile communication terminal 300, the control unit 206 according to the embodiment uses three profiles below.

A first profile is a Hands-Free Profile (HFP) for initiating or receiving a call by using a hands-free device. The HFP is a profile for a hands-free call function of the automotive navigation system.

Figure 5:
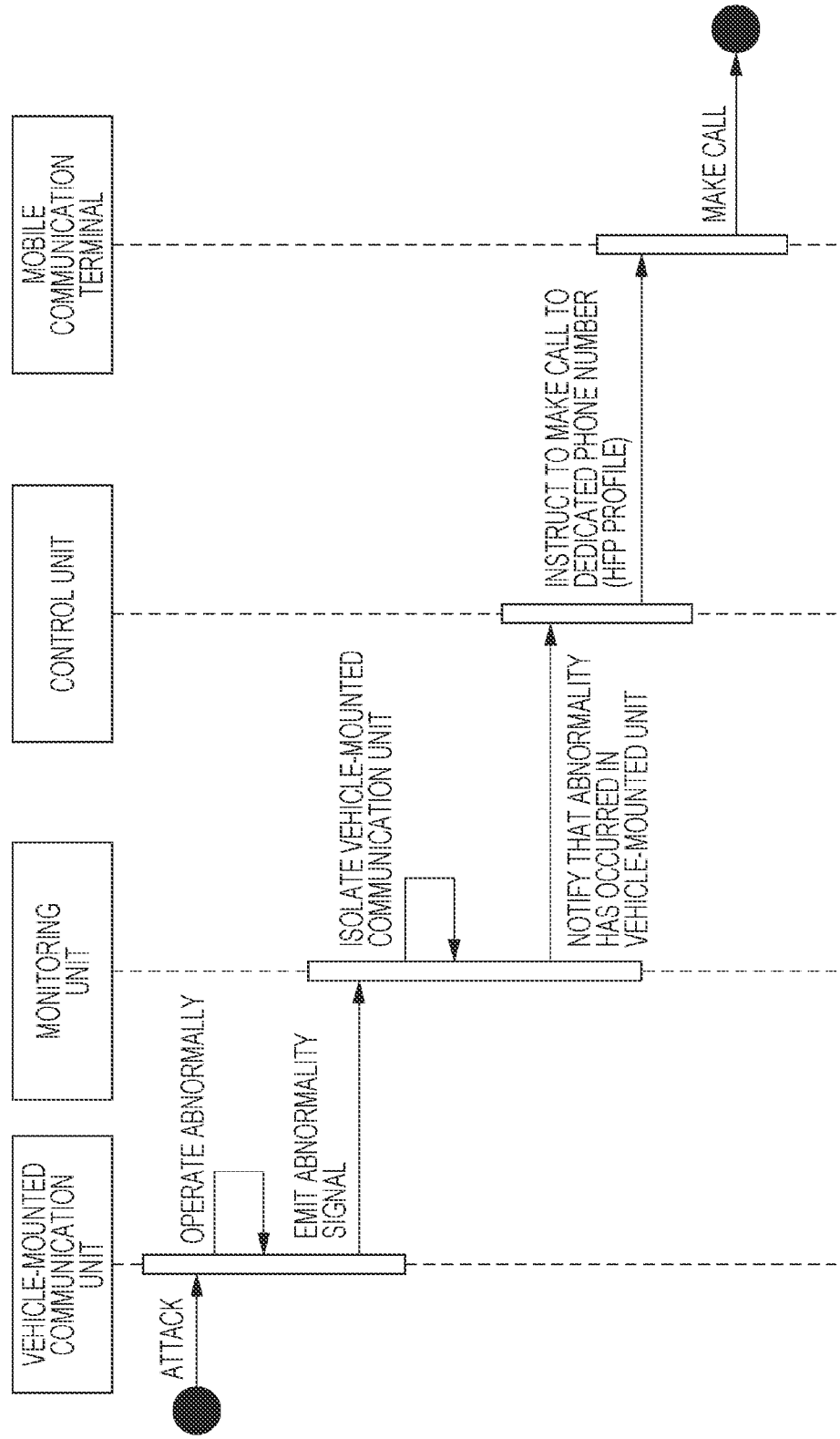
FIG. 5 is a timing chart of short-range wireless communication performed in accordance with a first profile.

FIG. 5 is a timing chart of short-range wireless communication performed in accordance with the first profile. As illustrated in FIG. 5, the vehicle-mounted communication unit 10a is hacked, operates abnormally, and emits an abnormality signal. The monitoring unit 202 detects the abnormality in the vehicle-mounted communication unit 10a on the basis of the abnormality signal, and isolates the vehicle-mounted communication unit 10a from the vehicle system 200. The monitoring unit 202 also notifies the control unit 206 that the abnormality has occurred in the vehicle-mounted communication unit 10a. For example, the monitoring unit 202 transmits incident information to the control unit 206 to notify the control unit 206 that the abnormality has occurred in the vehicle-mounted communication unit 10a.

When being notified of the abnormality in the vehicle-mounted communication unit 10a from the monitoring unit 202, the control unit 206 instructs the mobile communication terminal 300 to perform an operation for making a call to a dedicated phone number for reporting the abnormality in the vehicle-mounted communication unit 10a. The control unit 206 causes the mobile communication terminal 300 to make a call to the dedicated phone number, so as to report, to the external server 100 via the mobile communication terminal 300, the abnormality in the vehicle-mounted communication unit 10a while communication via the vehicle-mounted communication unit 10a is disconnected. With the HFP, the external server 100 can be notified of the abnormality in the vehicle-mounted communication unit 10a through a call to the dedicated phone number instead of through the incident information. Thus, the processing load of the control unit 206 and the mobile communication terminal 300 can be reduced.

A second profile is a Dial-up Networking Profile (DUN) for establishing a connection to the Internet by dialing up on the mobile communication terminal 300. The DUN is a profile for dial-up connection for short-range wireless communication implemented in the automotive navigation system.

Figure 6:
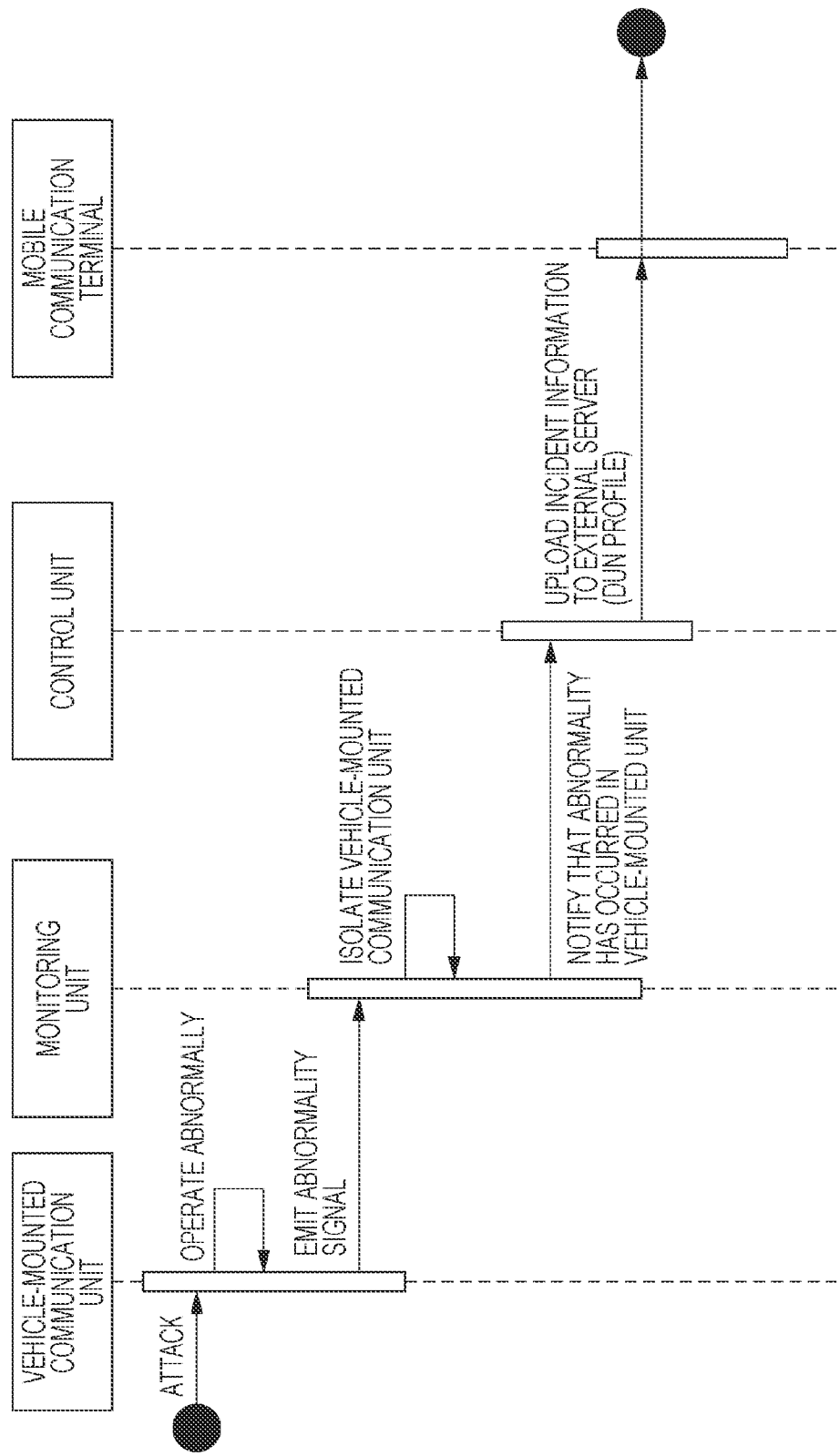
FIG. 6 is a timing chart of short-range wireless communication performed in accordance with a second profile.

FIG. 6 is a timing chart of short-range wireless communication performed in accordance with the second profile. As illustrated in FIG. 6, the vehicle-mounted communication unit 10a is hacked, operates abnormally, and emits an abnormality signal. The monitoring unit 202 detects the abnormality in the vehicle-mounted communication unit 10a on the basis of the abnormality signal, and isolates the vehicle-mounted communication unit 10a. The monitoring unit 202 also notifies the control unit 206 that the abnormality has occurred in the vehicle-mounted communication unit 10a. For example, the monitoring unit 202 transmits incident information to the control unit 206 to notify the control unit 206 that the abnormality has occurred in the vehicle-mounted communication unit 10a.

When being notified of the abnormality in the vehicle-mounted communication unit 10a from the monitoring unit 202, the control unit 206 instructs the mobile communication terminal 300 to perform an operation for establishing a connection to the Internet by dialing up in accordance with the DUN. The control unit 206 uploads the incident information indicating the abnormality in the vehicle-mounted communication unit 10a to the external server 100 via the mobile communication terminal 300 connected to the Internet by dialing up. With the DUN which has been used for a relatively long time, a short-range wireless communication connection can be established between the automotive navigation system and the mobile communication terminal 300 when the mobile communication terminal 300 is a device, for example, a mobile phone, that is older than the recent mobile terminal such as a smartphone.

A third profile is a File Transfer Profile (FTP) for transferring (communicating) a file. The FTP is a profile for data file transfer via short-range wireless communication implemented in the automotive navigation system.

Figure 7:
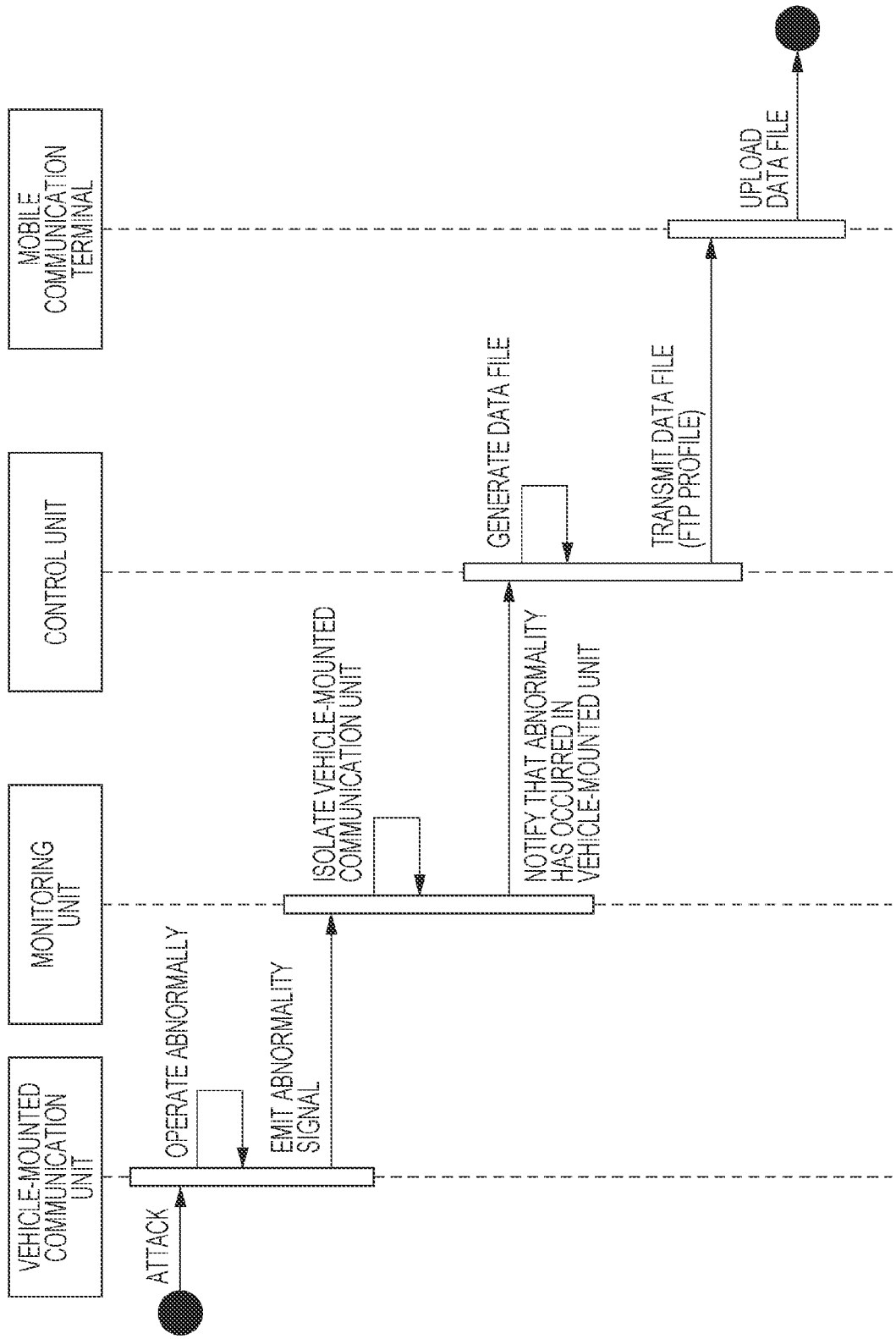
FIG. 7 is a timing chart of short-range wireless communication performed in accordance with a third profile.

FIG. 7 is a timing chart of short-range wireless communication performed in accordance with the third profile. As illustrated in FIG. 7, the vehicle-mounted communication unit 10a is hacked, operates abnormally, and emits an abnormality signal. The monitoring unit 202 detects the abnormality in the vehicle-mounted communication unit 10a on the basis of the abnormality signal, and isolates the vehicle-mounted communication unit 10a. The monitoring unit 202 also notifies the control unit 206 that the abnormality has occurred in the vehicle-mounted communication unit 10a. For example, the monitoring unit 202 transmits incident information to the control unit 206 to notify the control unit 206 that the abnormality has occurred in the vehicle-mounted communication unit 10a.

When being notified of the abnormality in the vehicle-mounted communication unit 10a from the monitoring unit 202, the control unit 206 generates a data file that includes incident information indicating the abnormality in the vehicle-mounted communication unit 10a. The control unit 206 instructs the mobile communication terminal 300 to perform an operation for uploading the data file via the Internet in accordance with the FTP. The control unit 206 transmits the data file to the mobile communication terminal 300 to cause the mobile communication terminal 300 to upload the data file to the external server 100 via the Internet. With the FTP, the incident information indicating details of the abnormality in the vehicle-mounted communication unit 10a can be included in the data file.

Figure 8:
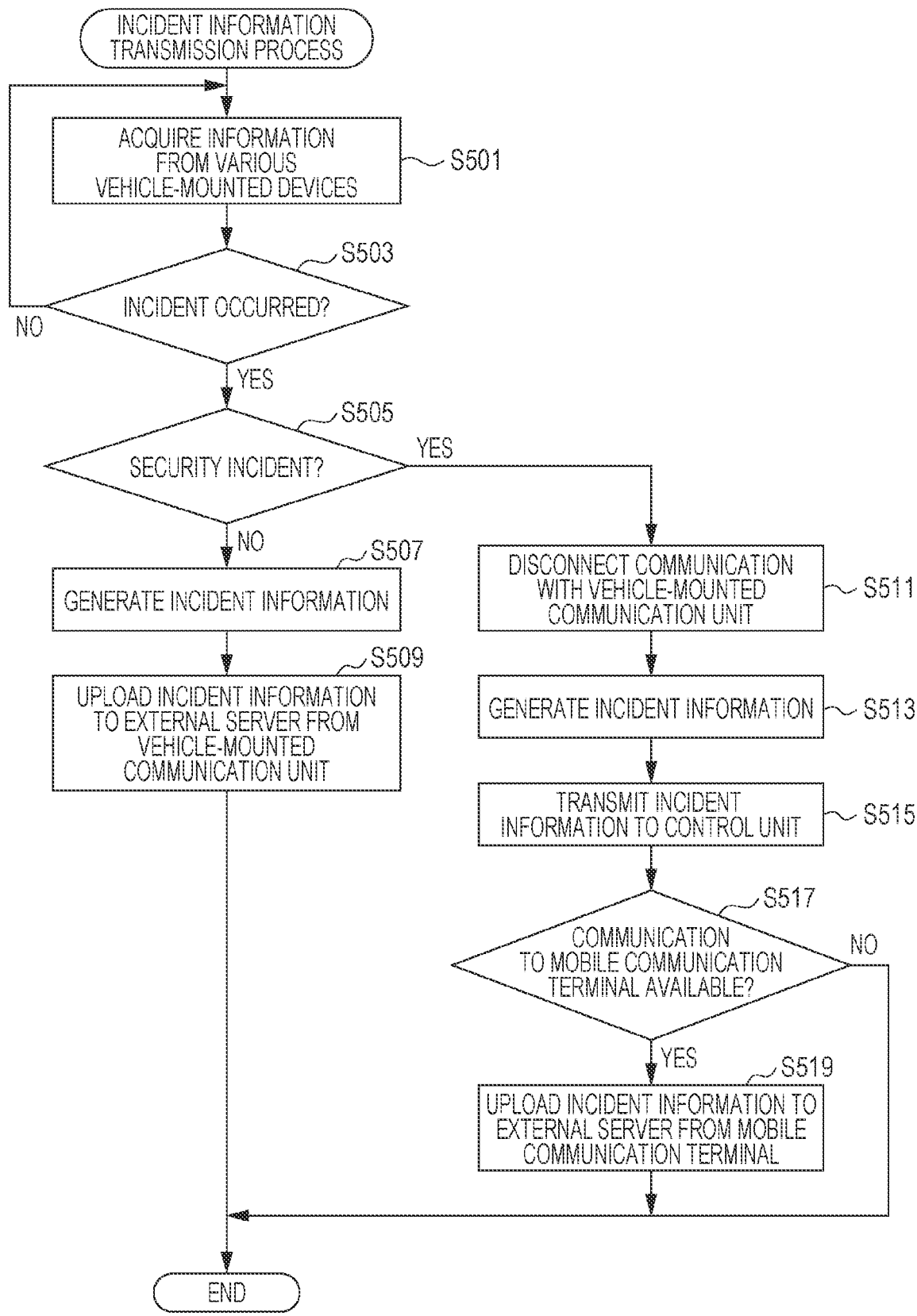
FIG. 8 is a flowchart illustrating an example of an incident information transmission process according to an embodiment.

FIG. 8 is a flowchart illustrating an example of an incident information transmission process according to the embodiment. As illustrated in FIG. 8, the monitoring unit 202 acquires information output from various vehicle-mounted devices (S501). For example, the monitoring unit 202 acquires information output from the vehicle-mounted communication unit 10a and the plurality of control units 204 and 206.

Based on the acquired information, the monitoring unit 202 determines whether an incident has occurred in the vehicle 10 (S503). If no incident has occurred in the vehicle 10 (NO in S503), the process returns to S501, in which the monitoring unit 202 acquires information output from the various vehicle-mounted devices again. If an incident has occurred in the vehicle 10 (YES in S503), the monitoring unit 202 determines whether the incident occurred is a security incident (S505). In this example, based on the information acquired from the vehicle-mounted communication unit 10a, the monitoring unit 202 determines whether an abnormality has occurred in the vehicle-mounted communication unit 10a because of the security incident.

If the incident occurred is not a security incident (NO in S505), the monitoring unit 202 generates incident information indicating that the incident has occurred in the vehicle 10 (S507). The monitoring unit 202 uploads the generated incident information to the external server 100 via the vehicle-mounted communication unit 10a (S509).

If the incident occurred is a security incident (YES in S505), the monitoring unit 202 disconnects communication with the vehicle-mounted communication unit 10a (S511). The monitoring unit 202 generates incident information indicating that a security incident has occurred in the vehicle-mounted communication unit 10a (S513). The monitoring unit 202 transmits the generated incident information to the control unit 206 (S515).

The control unit 206 determines whether short-range wireless communication to the mobile communication terminal 300 is available (S517). If short-range wireless communication is not available (NO in S517), the control unit 206 ends the incident information transmission process. If short-range wireless communication is available (YES in S517), the control unit 206 uploads the incident information to the external server 100 via the mobile communication terminal 300 (S519).

As described above, according to the embodiment, in response to detecting occurrence of an abnormality in the vehicle-mounted communication unit 10a, the monitoring unit 202 disconnects communication between the vehicle-mounted communication unit 10a and the monitoring unit 202. The monitoring unit 202 notifies the control unit 206 of the occurrence of the abnormality in the vehicle-mounted communication unit 10a. When being notified of the abnormality in the vehicle-mounted communication unit 10a from the monitoring unit 202, the control unit 206 instructs the mobile communication terminal 300 to perform an operation for reporting the abnormality in the vehicle-mounted communication unit 10a in accordance with a certain profile of a short-range wireless communication standard. Consequently, the abnormality in the vehicle-mounted communication unit 10a is reported to the external server 100 via the mobile communication terminal 300 while the communication via the vehicle-mounted communication unit 10a is disconnected. As a result, in response to occurrence of an abnormality in the vehicle-mounted communication unit 10a because of a security incident such as hacking, a likelihood of the security incident adversely influencing a behavior of the vehicle 10 can be reduced and information regarding the abnormality in the vehicle-mounted communication unit 10a can be transmitted to the external server 100.

The embodiment of the disclosure has been described above with reference to the accompanying drawings. However, the disclosure is not limited to such an embodiment. It is obvious that a person skilled in the art can conceive various alterations and modifications within a scope of the claims. It is to be understood that these alterations and modifications are, of course, included in the technical scope of the disclosure.

In the embodiment above, the case has been described where the control unit 206 is an automotive navigation system ECU that controls an automotive navigation system. However, the configuration is not limited to this, and the control unit 206 may be an automotive audio ECU that controls an automotive audio system not having an automotive navigation function. In such a case, the automotive audio system has profiles similar to those of the automotive navigation system. The control unit 206 is capable of wirelessly communicating with the mobile communication terminal 300 in accordance with a certain profile corresponding to a function of the automotive audio system among a plurality of profiles of a short-range wireless communication standard.

The vehicle system 200 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle system 200 including the vehicle-mounted communication unit 10a, the monitoring unit 202, and the control units 204 and 206. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:
1. A vehicle comprising:
 a vehicle-mounted communication unit installed in the vehicle and capable of wirelessly communicating information for a telematics service to and from an external server;

a monitoring unit configured to monitor whether an abnormality has occurred in the vehicle-mounted communication unit because of a security incident; and a control unit configured to control a vehicle-mounted device installed in the vehicle, wherein in response to detecting occurrence of an abnormality in the vehicle-mounted communication unit, the monitoring unit disconnects communication between the vehicle-mounted communication unit and the monitoring unit and notifies the control unit of the abnormality in the vehicle-mounted communication unit, and wherein the control unit is capable of wirelessly communicating with a mobile communication terminal in accordance with a certain profile corresponding to a function of the vehicle-mounted device among a plurality of profiles of a short-range wireless communication standard, and configured to instruct, when being notified of the abnormality in the vehicle-mounted communication unit from the monitoring unit, the mobile communication terminal to perform an operation for reporting the abnormality in the vehicle-mounted communication unit in accordance with the certain profile of the short-range wireless communication standard, so as to report the abnormality in the vehicle-mounted communication unit to the external server via the mobile communication terminal while the communication via the vehicle-mounted communication unit is disconnected.

2. The vehicle according to claim 1, wherein the certain profile comprises a Hands-Free Profile (HFP) that is a profile for a hands-free call function of the vehicle-mounted device, and wherein the control unit instructs, when being notified of the abnormality in the vehicle-mounted communication unit from the monitoring unit, the mobile communication terminal to perform an operation for making a call to a dedicated phone number for reporting the abnormality in the vehicle-mounted communication unit in accordance with the HFP and causes the mobile communication terminal to make the call to the dedicated phone number, so as to report the abnormality in the vehicle-mounted communication unit to the external server via the mobile communication terminal while the communication via the vehicle-mounted communication unit is disconnected.

3. The vehicle according to claim 2, wherein the short-range wireless communication standard comprises Bluetooth.

4. The vehicle according to claim 1, wherein the certain profile comprises a Dial-up Networking Profile (DUN) that is a profile for dial-up connection for the vehicle-mounted device, and wherein the control unit instructs, when being notified of the abnormality in the vehicle-mounted communication unit from the monitoring unit, the mobile communication terminal to perform an operation for establishing a dial-up connection to a network in accordance with the DUN and uploads incident information indicating the abnormality in the vehicle-mounted communication unit to the external server via the mobile communication terminal that is connected to the network by dialing up.

5. The vehicle according to claim 4, wherein the short-range wireless communication standard comprises Bluetooth.

6. The vehicle according to claim 1, wherein the certain profile comprises a File Transfer Profile (FTP) that is a profile for data file transfer for the vehicle-mounted device, and wherein the control unit generates, when being notified of the abnormality in the vehicle-mounted communication unit from the monitoring unit, a data file including incident information indicating the abnormality in the vehicle-mounted communication unit, instructs the mobile communication terminal to perform an operation for uploading the data file via a network in accordance with the FTP, and transmits the data file to the mobile communication terminal, so as to cause the mobile communication terminal to upload the data file to the external server via the network.

7. The vehicle according to claim 6, wherein the short-range wireless communication standard comprises Bluetooth.

8. The vehicle according to claim 1, wherein the short-range wireless communication standard comprises Bluetooth.

9. A vehicle comprising:

circuitry installed in the vehicle, having a communication capability of wirelessly communicating information for a telematics service to and from an external server, configured to monitor whether an abnormality has occurred in the communication capability because of a security incident, and configured to control a vehicle-mounted device installed in the vehicle, wherein in response to detecting occurrence of an abnormality in the communication capability, the circuitry disables the communication capability, and wherein the circuitry is capable of wirelessly communicating with a mobile communication terminal in accordance with a certain profile corresponding to a function of the vehicle-mounted device among a plurality of profiles of a short-range wireless communication standard, and configured to instruct, in response to detecting the abnormality in the communication capability, the mobile communication terminal to perform an operation for reporting the abnormality in the communication capability in accordance with the certain profile of the short-range wireless communication standard, so as to report the abnormality in the communication capability to the external server via the mobile communication terminal while the communication capability is disabled.

* * * * *